United States Patent
Baughman et al.

(10) Patent No.: US 10,614,109 B2
(45) Date of Patent: Apr. 7, 2020

(54) NATURAL LANGUAGE PROCESSING KEYWORD ANALYSIS

(71) Applicant: International Business Machines Corporation, Armonk, NY (US)

(72) Inventors: Aaron K. Baughman, Silver Spring, MD (US); Gary F. Diamanti, Wake Forest, NC (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 15/472,437

(22) Filed: Mar. 29, 2017

(65) Prior Publication Data

US 2018/0285446 A1  Oct. 4, 2018

(51) Int. Cl.
*G06F 7/00* (2006.01)
*G06F 17/30* (2006.01)
*G06F 16/33* (2019.01)
*G06F 17/27* (2006.01)
(Continued)

(52) U.S. Cl.
CPC .......... *G06F 16/334* (2019.01); *G06F 16/313* (2019.01); *G06F 16/3344* (2019.01); *G06F 16/3347* (2019.01); *G06F 16/93* (2019.01); *G06F 17/2735* (2013.01); *G06F 17/2785* (2013.01)

(58) Field of Classification Search
CPC .............. G06F 16/3347; G06F 16/313; G06F 16/3344; G06F 16/334; G06F 16/93
See application file for complete search history.

(56) References Cited

U.S. PATENT DOCUMENTS 5,821,943 A    10/1998 Shashua
8,706,747 B2    4/2014 Mittal et al.
9,069,768 B1 *  6/2015 Sampson ........... G06K 9/00463
(Continued)

FOREIGN PATENT DOCUMENTS

WO    2015016736 A2    2/2015

OTHER PUBLICATIONS

Baughman et al., "Natural Language Processing Keyword Analysis", U.S. Appl. No. 15/855,073, filed Dec. 27, 2017, 29 pages.
(Continued)

*Primary Examiner* — Hasanul Mobin
(74) *Attorney, Agent, or Firm* — Stephen R. Yoder; Gilbert Harmon, Jr.

(57) ABSTRACT

As disclosed herein, a method for generating a natural language processing query includes receiving one or more documents, wherein each document comprises a set of words, processing the one or more documents and the sets of words to provide a document content matrix V, a word feature matrix W, and a document feature matrix H, forecasting values for each entry of the word feature matrix and the document feature matrix over a selected time interval and a selected set of domains to provide a forecasted word feature matrix W' and a forecasted document feature matrix H', calculating a set of coefficients for forecasted document feature matrix H' such that V=W' *H', determining a rank for each word of the sets of words according to the calculated set of coefficients, and generating one or more queries according to the determined ranks for each word of the set of words.

15 Claims, 5 Drawing Sheets

(51) Int. Cl.
*G06F 16/93* (2019.01)
*G06F 16/31* (2019.01)

(56) References Cited

U.S. PATENT DOCUMENTS

| | | | |
|---|---|---|---|
| 9,183,203 B1 | 11/2015 | Tuchman et al. | |
| 2002/0107850 A1* | 8/2002 | Sugimoto | G06F 16/40 |
| 2002/0129015 A1* | 9/2002 | Caudill | G06F 16/353 |
| 2002/0152202 A1* | 10/2002 | Perro | G06F 16/3334 |
| 2003/0103675 A1* | 6/2003 | Endo | G06K 9/6218 |
| | | | 382/229 |
| 2004/0261021 A1* | 12/2004 | Mittal | G06F 3/0237 |
| | | | 715/256 |
| 2007/0050356 A1* | 3/2007 | Amadio | G06F 16/334 |
| 2007/0067281 A1 | 3/2007 | Matveeva et al. | |
| 2007/0172154 A1* | 7/2007 | Kobara | G06K 9/00442 |
| | | | 382/305 |
| 2008/0109419 A1* | 5/2008 | Murakami | G06F 16/951 |
| 2009/0024607 A1* | 1/2009 | Sun | G06F 16/334 |
| 2013/0159337 A1* | 6/2013 | Lee | G06Q 30/0277 |
| | | | 707/763 |
| 2014/0280952 A1 | 9/2014 | Shear | |
| 2017/0228414 A1* | 8/2017 | Shazeer | G06K 9/6243 |
| 2017/0323636 A1 | 11/2017 | Xiao et al. | |

OTHER PUBLICATIONS

IBM Appendix P, list of patents or patent applications treated as related, filed herewith, 2 pages.

Bondarev et al., "CARAT: a Toolkit for Design and Performance Analysis of Component-Based Embedded Systems", DATE07 © 2007 EDAA, Proceedings of the conference on Design, automation and test in Europe, 6 pages.

Rogers et al, "Multilinear Dynamical Systems for Tensor Time Series", EECS Department, University of California, Berkeley, NIPS 2013, Conf. Proceedings, 9 pages.

Shrestha et al., "Automatic Mashup Generation from Multiple-camera Concert Recordings", MN'10, Oct. 25-29, 2010, Firenze, Italy, Copyright 2010, 10 pages.

Turcato et al., "Adapting a synonym database to specific domains", ACL-2000, vol. 11. Assoc for Computational Linguistics, 11 pages.

Wait, James, R., Electromagnetic Response of a Dipping Anisotropic Half-Space, IEEE Transactions on Antennas and Propagation (vol. 39, Issue: 2), © 1991 IEEE.

Wei et al., "Experimental evaluation of the surface specificity of sum-frequency vibrational spectroscopy", Quantum Electronics and Laser Science Conference, 2000, (QELS 2000), Technical Digest 12-12 May 2000, 2 pages.

* cited by examiner

NATURAL LANGUAGE PROCESSING KEYWORD ANALYSIS

BACKGROUND OF THE INVENTION

The present invention relates generally to the field of natural language processing, and more specifically to generating natural language processing queries.

Natural language processing (NLP) is a field of computer science, artificial intelligence, and computational linguistics concerned with the interactions between computers and human (natural) languages. In particular, NLP is concerned with programming computers to process large natural language corpora. Natural language processing systems are being deployed with hundreds of simultaneous users. Users can reformulate questions based on knowledge returned from an NLP system.

SUMMARY

As disclosed herein, a method for generating a natural language processing query includes receiving one or more documents, wherein each document comprises a set of words, processing the one or more documents and the sets of words to provide a document content matrix V corresponding to the one or more documents and the sets of words, a word feature matrix W corresponding to a set of selected features and the sets of words, and a document feature matrix H corresponding to the one or more documents and the set of selected features, forecasting values for each entry of the word feature matrix and the document feature matrix over a selected time interval and a selected set of domains to provide a forecasted word feature matrix W' and a forecasted document feature matrix H', calculating a set of coefficients for forecasted document feature matrix H' such that V=W'*H', determining a rank for each word of the sets of words according to the calculated set of coefficients, and generating one or more queries according to the determined ranks for each word of the set of words. A computer program product and a computer system corresponding to the method are also disclosed.

DETAILED DESCRIPTION

Cultural specific semantics such as "slang" terms introduce an additional complication to natural language processing. With more and more words carrying both a so-called "dictionary" definition and a completely separate "slang" definition, it becomes more important to utilize contextual information to train natural language processing systems to perform parallel searches according to these separate definitions.

The present invention will now be described in detail with reference to the Figures. Implementation of embodiments of the invention may take a variety of forms, and exemplary implementation details are discussed subsequently with reference to the Figures.

Figure 1:
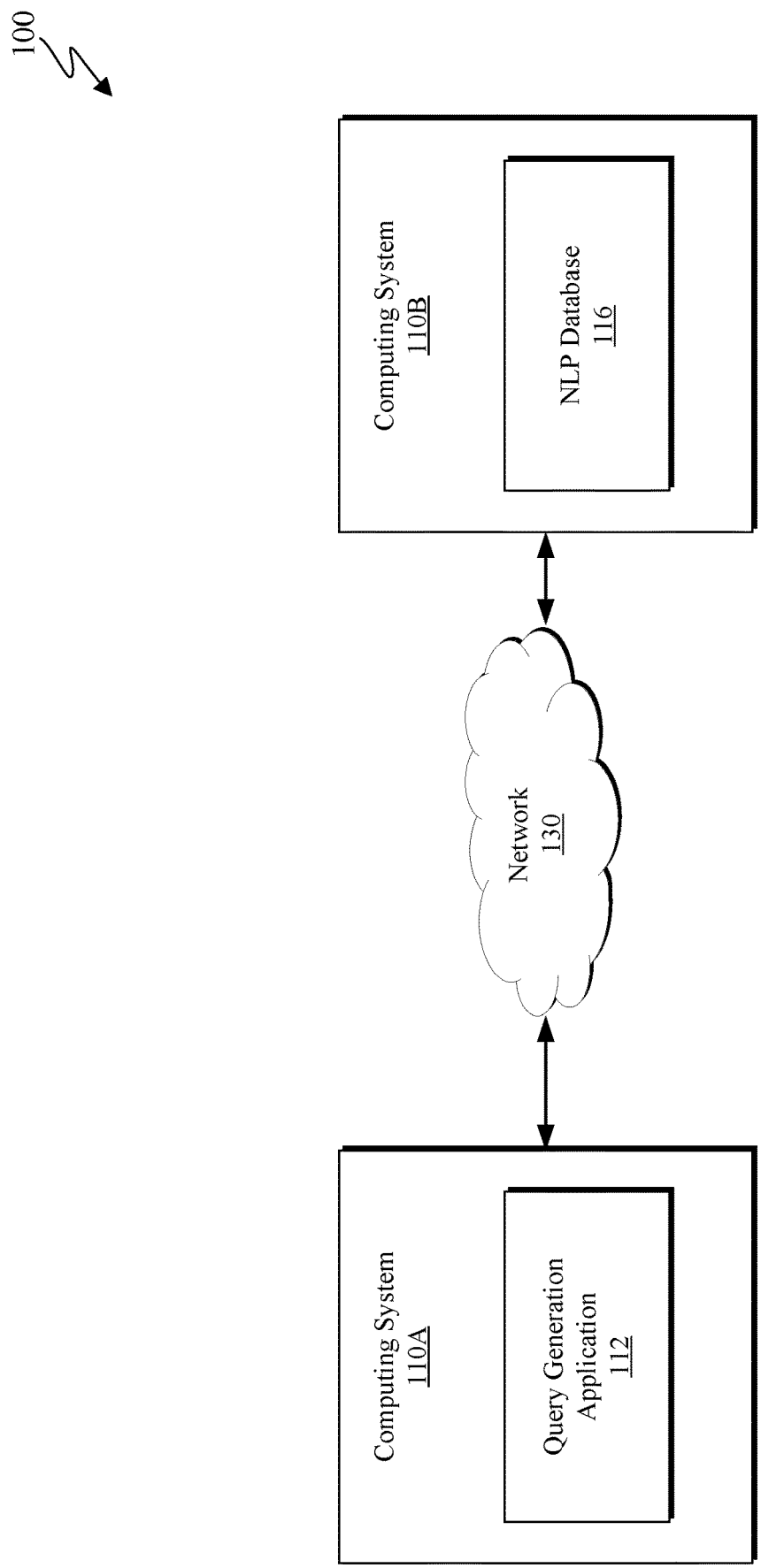
FIG. 1 is a functional block diagram depicting a natural language processing system in accordance with some embodiments of the present invention.

FIG. 1 is a functional block diagram depicting a natural language processing system 100 in accordance with some embodiments of the present invention. As depicted, natural language processing system 100 includes two computing systems 110 (i.e., 110A and 110B), a query generation application 112, a natural language processing database 116, and a network 130. It should be noted that, while FIG. 1 depicts separate computing systems 110 hosting query generation application 112 and natural language processor 114, in another embodiment these services may all be hosted on the same computing system. Natural language processing system 100 enables NLP query generation that leverages parallel searches based on multiple definitions of a keyword.

Computing systems 110 can be desktop computers, laptop computers, specialized computer servers, or any other computer systems known in the art. In some embodiments, computing systems 110 represent computer systems utilizing clustered computers and components to act as a single pool of seamless resources. In general, computing systems 110 are representative of any electronic devices, or combinations of electronic devices, capable of executing machine-readable program instructions, as described in greater detail with regard to FIG. 5.

As depicted, computing system 110A comprises a query generation application 112. Query generation application 112 may be configured to execute an NLP query creation method to generate NLP queries according to a plurality of entries. In at least one embodiment, query generation application 112 is configured to receive a set of one or more documents. Query generation application 112 may be further configured to process and analyze the received documents. One embodiment of an appropriate NLP query creation method is described with respect to FIG. 2. Query generation application 112 may also be configured to execute a word rank generation method, such as the one described with respect to FIG. 3.

As depicted, computing system 110B comprises an NLP database 116. NLP database 116 may be a data store in which a plurality of data items relating to natural language processing tasks are stored. For example, NLP database 116 may store dictionary information for multiple languages, semantic information for the appropriate languages, user information for users within a relevant network, search histories, search preferences, etc. While NLP database 116 is depicted as being hosted on a separate computing system from the query generation application 112, it should be appreciated that in other embodiments, query generation application 112 and NLP database 116 may coexist on the same system.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computing system 110A and 110B in accordance with an embodiment of the present invention. In at least one embodiment of the present invention, network 130 transmits NLP queries between computing system 110A and computing system 110B.

Figure 2:
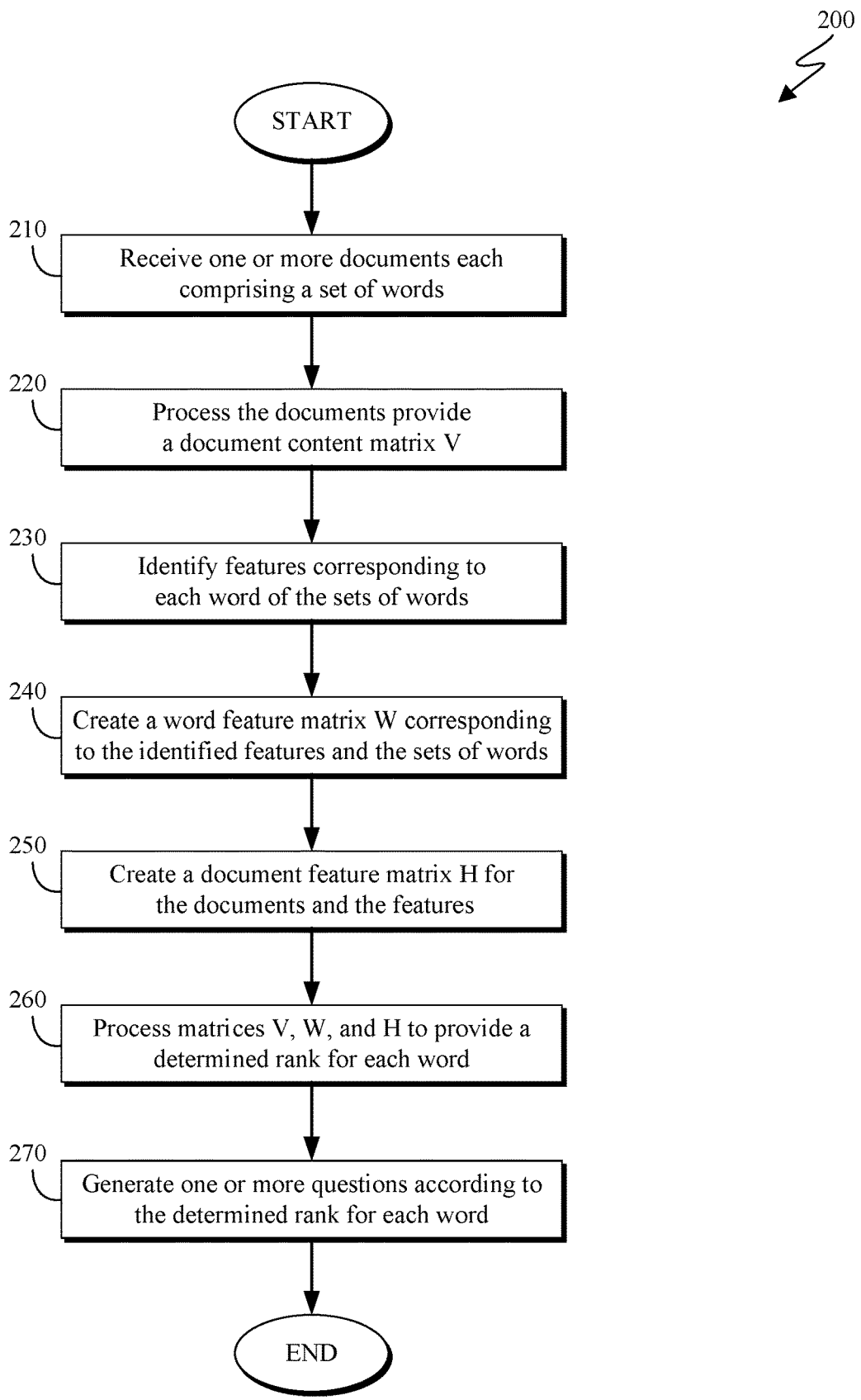
FIG. 2 is a flowchart depicting an NLP query creation method in accordance with at least one embodiment of the present invention.

FIG. 2 is a flowchart depicting an NLP query creation method 200 in accordance with at least one embodiment of the present invention. As depicted, NLP query creation method 200 includes receiving (210) one or more documents each comprising a set of words, processing (220) the one or more documents to provide a document content matrix "V", identifying (230) features corresponding to each word from the sets of words, creating (240) a word feature matrix "W" corresponding to the identified features from the plurality of words, creating (250) a document feature matrix "H" corresponding to the documents and a set of coefficients for the identified features, processing (260) matrices "V", "W", and "H" to provide a determined rank for each word from the sets of words, and generating (270) one or more questions according to the determined rank for each word. NLP query creation method 200 enables query generation according to parallel searches based on multiple definitions of a keyword.

Receiving (210) one or more documents each comprising a set of words may include receiving a user initiated keyword search. In at least one embodiment, query generation application 112 identifies historical searches by the user, semantic meanings and surface level contours associated with the keyword search, and searches conducted by other users that are related to the keyword search. Query generation application 112 analyzes the results of each of these identified searches and accompanying metrics to identify one or more documents to be analyzed, wherein each of the one or more documents comprises a set of words. In other words, each time a search is executed, the search terms and a list of documents identified by the search are received. In some embodiments, query generation application 112 sets a maximum on the number of documents that will be received, or that will be analyzed. In cases where the received documents include pictures or any content other than text, a configurable setting is available to indicate whether or not to process text within images or videos, where applicable.

Figure 4:
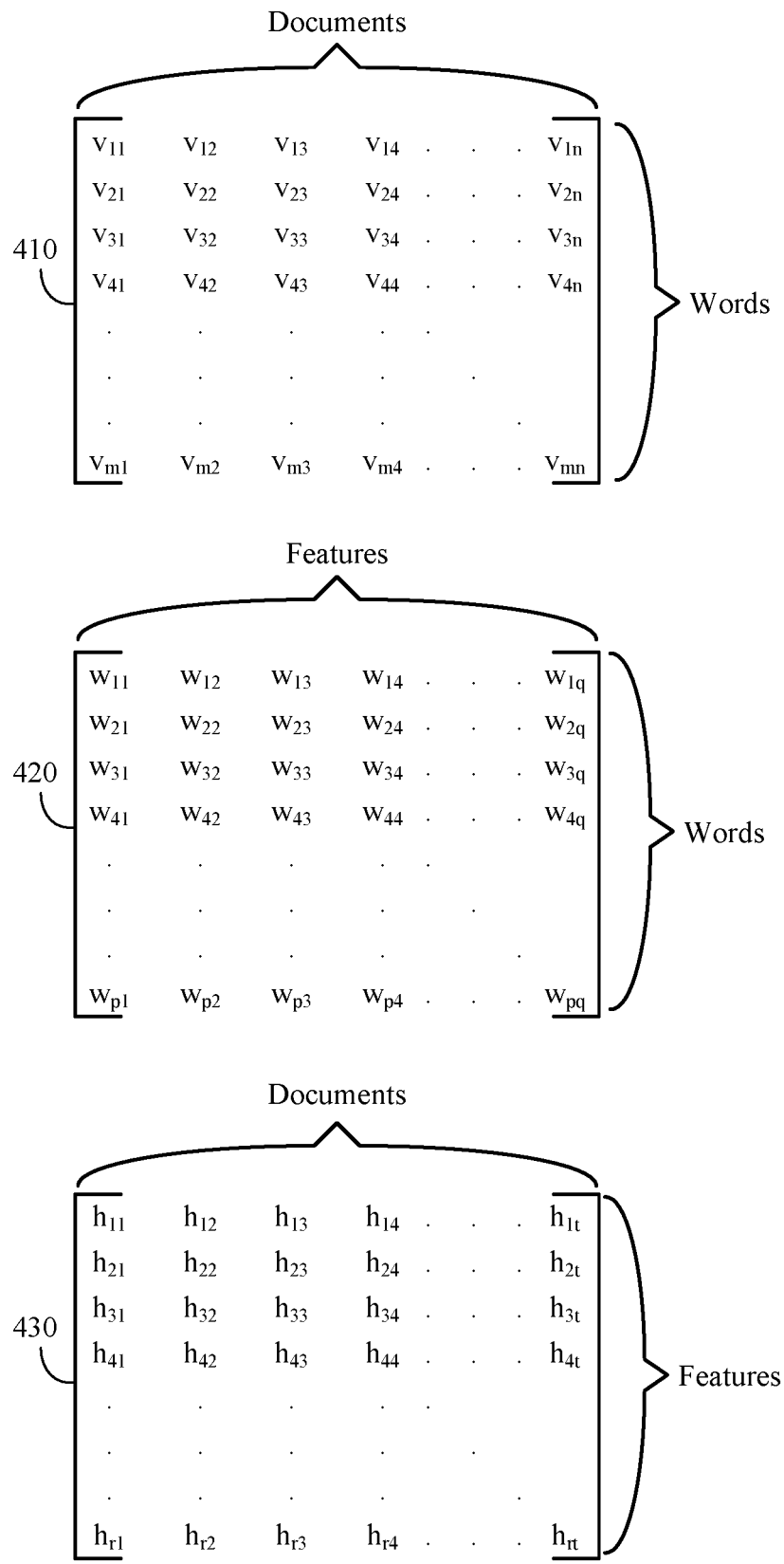
FIG. 4 depicts a plurality of matrices in accordance with one embodiment of the present invention.

Processing (220) the one or more documents to provide a document content matrix "V" may include identifying each word within each document. Query generation application 112 creates a column in a matrix "V" corresponding to each document, and creates a row in each matrix corresponding to each word within a document. In one embodiment, each time query generation application 112 encounters a word within a document, query generation application 112 determines whether or not a row in matrix "V" exists corresponding to said word. If a row does already exist, query generation application 112 updates an entry in the column corresponding to the document that indicates the word is present in said document. In at least one embodiment, query generation application 112 updates the entry in the appropriate column to indicate how many times the word appears in the document. If a row does not exist, query generation application 112 creates a row corresponding to the word prior to creating an entry in the appropriate column. FIG. 4A depicts one example of a document content matrix 410 wherein each row corresponds to a word, and each column corresponds to a document.

In at least one embodiment of the present invention, matrix "V" includes separate rows for unique contextual appearances of a word. For example, one document may contain the following phrases: "Rotate the screw 270 degrees so the arrow is pointing to the right of the board", and "Before drilling the hole, double check to make sure you are using the right drill bit." The word "right" appears in both of these phrases, but has a distinctly different meaning in each phrase. The context in which each instance of the word appears is indicative of which definition of the word is appropriate. With respect to this example, query generation application 112 creates separate entries for these two unique uses of the word "right". In some embodiments, query generation application 112 creates a separate matrix row for each contextually unique appearance of a word, as determined by the syntax of the phrase or sentence surrounding the word. In other embodiments, query generation application 112 identifies an appropriate definition for each instance of the word, and creates a unique matrix entry only if a row corresponding to the appropriate definition of the word does not exist already.

Identifying (230) features corresponding to each word from the sets of words may include analyzing each word with respect to one or more selected features. In some embodiments, query generation application 112 is configured to either receive or determine a set of features corresponding to each word. As used herein, a word "feature" refers to a characteristic of the word, either calculated or observable, many of which correspond directly to how frequently a word is used in a particular context. Example features may be a word's Indri rank, Lucene rank, language model rank, prismatic cut count, platform rank (wherein a platform rank is a word's rank on a particular platform, such as a social media site or other website), user rank for any number of users, user language rank for any number of users, and a word disagreement metric for any number of users.

In some embodiments, identifying (230) features corresponding to each word includes receiving feature information that indicates one or more features with respect to which each document is to be analyzed. For example, the feature information may indicate that the selected features are platform rank, user rank for User A, user rank for user B, and Lucene rank. Query generation application 112 may either receive these feature values from another source, or may be configured to calculate each of these features for each word. For example, with respect to the Lucene rank feature, query generation application 112 may receive the Lucene rank (or Lucene score) from another application that has already calculated it. If no such application or source exists to provide the Lucene rank, query generation application 112 is configured to calculate the Lucene rank for each word according to Lucene's practical scoring function. The same concept is applied to each selected feature. One or more feature combinations may be identified using either the Newton-Raphson method, Stochastic gradient descent (SGD), or any other iterative method known in the art. In at least one embodiment, identifying (230) features corresponding to each word further includes using one of these methods to weight multiple features into a single combined feature.

The Newton-Raphson method is an iterative method that adjusts feature weights. Each iteration of the method provides a result $x_{n+1}$ that is based on a result from a previous iteration $x_n$. The method approximates roots of a function F by making an initial estimate $x_0$—for a root of the function F. and identifies an improved estimate $x_1$ according to the equation:

$$x_{n+1} = x_n - F(x_n)/F'(x_n) \quad (1)$$

With respect to equation (1), $F'(x_n)$ indicates the derivative of the function F at point $x_n$. Equation (1) may be used iteratively to continually improve the estimate until the changes in the calculated root $x_{n+1}$ become minimal upon each iteration, indicating that the approximate root has been identified. The results of the Newton-Raphson method may identify a set of best feature combinations.

Stochastic descent gradient is a method for identifying a parameter that minimizes the following equation (2).

$$Q(w)=(1/n)*\Sigma Q_i(w) \quad (2)$$

With respect to equation (2), the summation function is calculated from i=1 to i=n, wherein Q is an objective function of the variable w, n corresponds to the number of data points in a dataset, and $Q_i$ corresponds to the $i^{th}$ observation in a dataset. The parameter $w_{min}$ that minimizes equation (2) is identified according to the following equation:

$$w_n = w_{n-1} - \acute{\eta} \Sigma \nabla Q_i(w_{n-1})/n \quad (3)$$

With respect to equation (3), $w_{n-1}$ corresponds to a previously calculated $w_n$ value. Once repeated iterations of equation (3) begin to yield minimal delta values between $w_n$ and $w_{n-1}$, an approximation of parameter w that minimizes equation (2) has been reached.

Creating (240) a word feature matrix "W" corresponding to the identified features from the plurality of words may include generating a matrix "W" that indicates values for each feature displayed by each word. In one embodiment, each row corresponds to a word identified in one of the received documents. In the same embodiment, each column corresponds to a feature to be analyzed for each of the words. Each entry in matrix "W" in said embodiment includes a numerical value indicating how prominently the word indicated by the row displays the feature indicated by the column. For some features or feature combinations, the numerical values are identified according to the methods discussed with respect to step 230. Other features may have easily discernible numerical values; for example, a word's platform rank. An example word feature matrix 420 is depicted with respect to FIG. 4, wherein each row corresponds to a word and each column corresponds to a feature of the word(s).

Creating (250) a document feature matrix "H" corresponding to the documents and a set of coefficients for the identified features may include generating a matrix "H" that indicates values for each feature displayed across each document. It should be noted that the features included in the document feature matrix "H" are the same as the features included in the word feature matrix "W." In one embodiment, each row corresponds to a feature analyzed for the words within the documents. In the same embodiment, each column corresponds to one of the received documents. Query generation application 112 may calculate an aggregate feature score for each document by calculating the sum of the feature scores from the word feature matrix "W" for each word in the document. In another embodiment, query generation application 112 determines an aggregate feature score by taking the average of the feature score for each word in said document. The calculated aggregate feature score for the document is included in the document feature matrix "H" in the appropriate row-column entry. An example document feature matrix 430 is depicted with respect to FIG. 4, wherein each row corresponds to a feature and each column corresponds to a document.

Processing (260) matrices "V", "W", and "H" to provide a determined rank for each word from the sets of words may include performing matrix operations to calculate weight coefficients within document feature matrix "H". In one embodiment, query generation application 112 executes a word rank determination method to provide a ranked set of words. The ranked set of words includes the sets of words from each of the documents, wherein the words are ranked according to one or more calculated document feature scores. Details of one example of an appropriate word rank determination method are discussed with respect to FIG. 3.

Generating (270) one or more questions according to the determined rank for each word may include using the top ranked words to generate search phrases or questions corresponding to the original query. The questions may be generated using a query template. A query template as used herein refers to a template from which queries will be generated using the determined word ranks. In one embodiment, a query template may include slots for a subject, a verb, and an object. Such a template will be filled out by taking the highest ranked subject, the highest ranked verb, and the highest ranked object, and plugging them into the template. A template may include filler terms around the word slots. Each word may be used in a plurality of generated queries. For example, the highest ranked subject may be used in conjunction with the highest ranked verb and the highest ranked object in one query, and with the second-highest ranked verb and the second-highest ranked object in another generated query.

Figure 3:
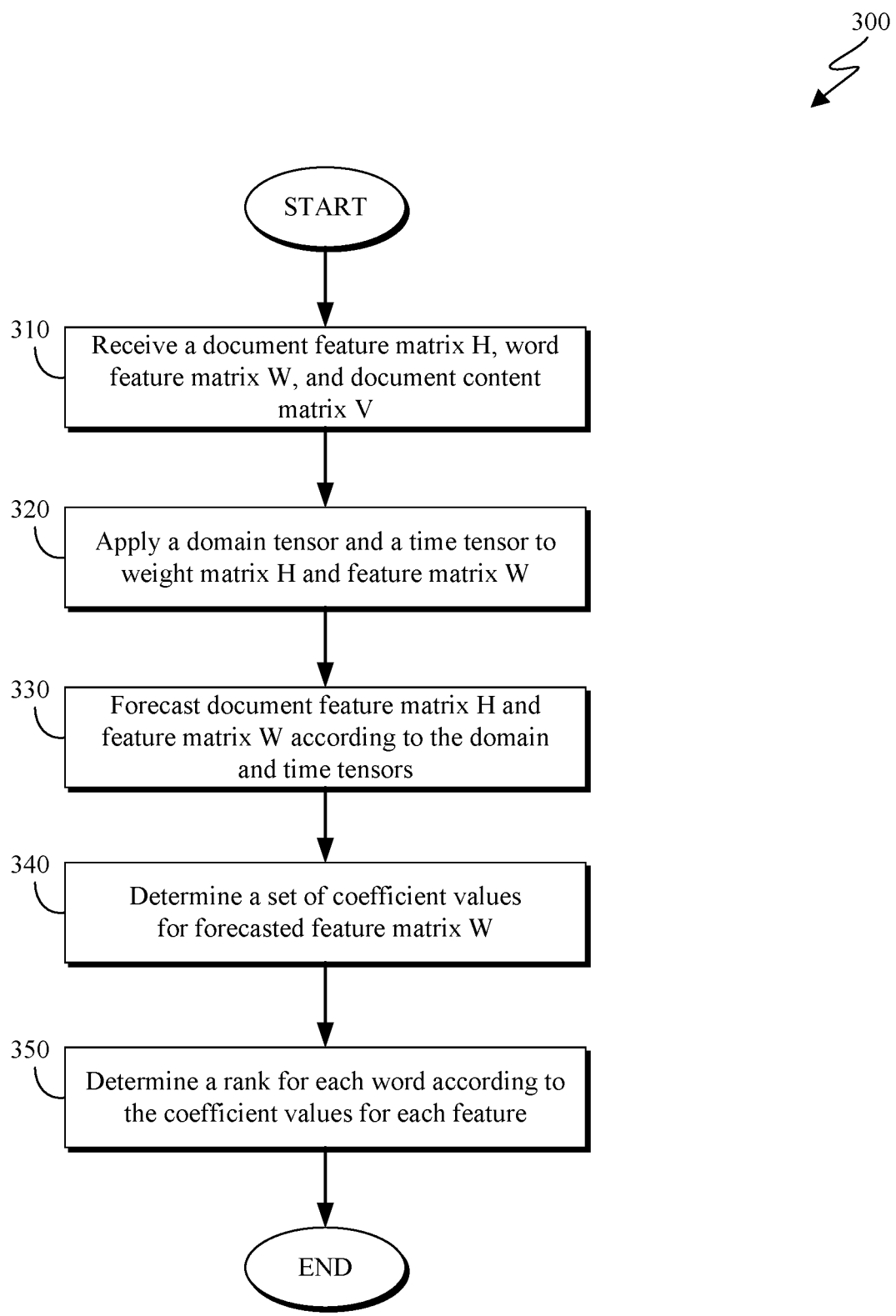
FIG. 3 is a flowchart depicting a word rank determination method 300 in accordance with at least one embodiment of the present invention.

FIG. 3 is a flowchart depicting a word rank determination method 300 in accordance with at least one embodiment of the present invention. As depicted, word rank determination method 300 includes receiving (310) a document feature matrix "H", a word feature matrix "W", and a document content matrix "V", applying (320) a domain tensor and a time tensor to document feature matrix "H" and word feature matrix "W", forecasting (330) document feature matrix "H" and word feature matrix "W" according to the domain and time tensors, determining (340) coefficient values for word feature matrix "W" such that V=WH, and determining (350) a rank for each word according to the determined coefficient values for each feature. Word rank determination method 300 enables a plurality of words to be ranked according to a set of weighted features.

Receiving (310) a document feature matrix "H", a word feature matrix "W", and a document content matrix "V" may include query generation application 112 receiving a document content matrix wherein each row corresponds to a word from within a document, and each column corresponds to a document. In other words, an entry wherein "i" indicates the row and "j" indicates the column, indicates whether the word corresponding to row "i" exists in the document indicated by column "j." A word feature matrix "W" may be a matrix wherein each row corresponds to a word and each column corresponds to a feature about the words. In other words, an entry $W_{ij}$, wherein "i" indicates the row and "j" indicates the column, corresponds to a value indicating how prominently the word indicated by row "i" displays the feature indicated by column "j." A document feature matrix "H" may be a matrix wherein each row corresponds to a feature and each column corresponds to a document. In other words, an entry $H_{ij}$, wherein "i" indicates the row and "j" indicates the column, corresponds to a value indicating how prominently the feature indicated by row "i" is displayed in the document indicated by column "j." The matrices "H", "W", and "V" are the same matrices as discussed with respect to FIG. 2. In some embodiments, query generation application 112 identifies the matrices in a database. In other embodiments, query generation application 112 creates the matrices as described with respect to FIG. 2.

Applying (320) a domain tensor and a time tensor to document feature matrix "H" and word feature matrix "W" may include adding two more dimensions to the matrices "H" and "W". A domain as used herein is defined as a specific subject area (such as animals, books, trucks, locations, etc.) that is used to build language models. Applying (320) a domain tensor may include adding a third degree to the matrices "H" and "W" according to a selected number of domains. For example, if matrix "H" has 10 features (rows) and 500 documents (columns), and 20 domains are selected, then matrix "H" becomes a 10×500×20 tensor. Similarly, if matrix "W" has 10,000 words (rows) and 10 features (columns), and 20 domains are selected, then matrix "W" becomes a 10,000×10×20 tensor.

Applying (320) a domain tensor and a time tensor may further include adding a fourth degree to the third degree tensors "H" and "W" according to a selected period of time. Applying (320) a time tensor may further include specifying a unit of time. Continuing the examples used previously, if "H" has 10 features, 500 documents, and 20 selected domains, and a time period of 30 minutes is selected, then "H" becomes a 10×500×20×30 tensor. Similarly, if "W" has 10,000 words, 10 features, and 20 selected domains, and a time period of 30 minutes is selected, then "W" becomes a 10,000×10×20×30 tensor.

Forecasting (330) weight tensor "H" and feature tensor "W" according to the domain and time tensors may include projecting values for a selected point "T" in the selected period of time. For example, continuing with the example used previously with a selected time period of 30 minutes, the selected point "T" may be the end of that interval (T=30). In that case, each value is projected using any number of predictive modeling methods known in the art. Predictive modeling uses statistics to predict outcomes, in many cases on the basis of detection theory. Forecasting the weight tensor "H" and feature tensor "W" with respect to the ongoing example provides a forecasted (10×500×20) weight tensor "H" and a forecasted (10,000×10×20) feature tensor "W."

Determining (340) a set of coefficient values for forecasted word feature matrix "W" may include executing matrix multiplication such that V=WH, wherein each entry of forecasted word feature matrix includes a variable corresponding to a selected weight for the feature associated with said entry. In at least one embodiment, each entry in a shared column of forecasted word feature matrix "W" includes the same variable, as each entry in a shared column corresponds to the same feature. Determining (340) a set of coefficient values for forecasted word feature matrix "W" may further include scaling the determined coefficients to fall within a selected range.

Determining (350) a rank for each word according to the determined coefficient values for each feature may include calculating an aggregate weight for each word according to the document feature matrix. In one embodiment, query generation application 112 calculates an average across each row in the document feature matrix to provide an aggregate weight for the corresponding words. In another embodiment, query generation application 112 calculates a summation of all entries within a row to provide an aggregate weight for a corresponding word. Determining (350) a rank for each word may further include ordering or sorting the words according to their determined aggregate weights. Query generation application 112 may assign a rank to each word according to their order. In at least one embodiment, query generation application 112 assigns ranks 1 through n, where n is the total number of words, and a smaller weight (i.e. a weight closer to 1) indicates a higher weight. In other embodiments, query generation application 112 assigns ranks according to a distribution. That is to say, query generation application 112 groups words together according to similar calculated aggregate weights. For a group of 10,000 words, the words may be split into 20 groups of 500 words each. The 500 words with the highest aggregate weights are given rank 1, the 500 words with the next highest weights are given rank 2, and so on.

Determining a word rank may further include determining a word type for each word. For example, query generation application 112 may assign word types according to what part of speech a word is, what topics the word is associated with, or any other criteria that may be used to differentiate between two terms. In such embodiments, word rank may be assigned globally (wherein for a group of 500 words, the words are ranked 1-500 regardless of the word types), or according to rank (wherein for a group of 500 words with 250 verbs and 250 nouns, each verb is ranked 1-250 and each noun is ranked 1-250).

Figure 5:
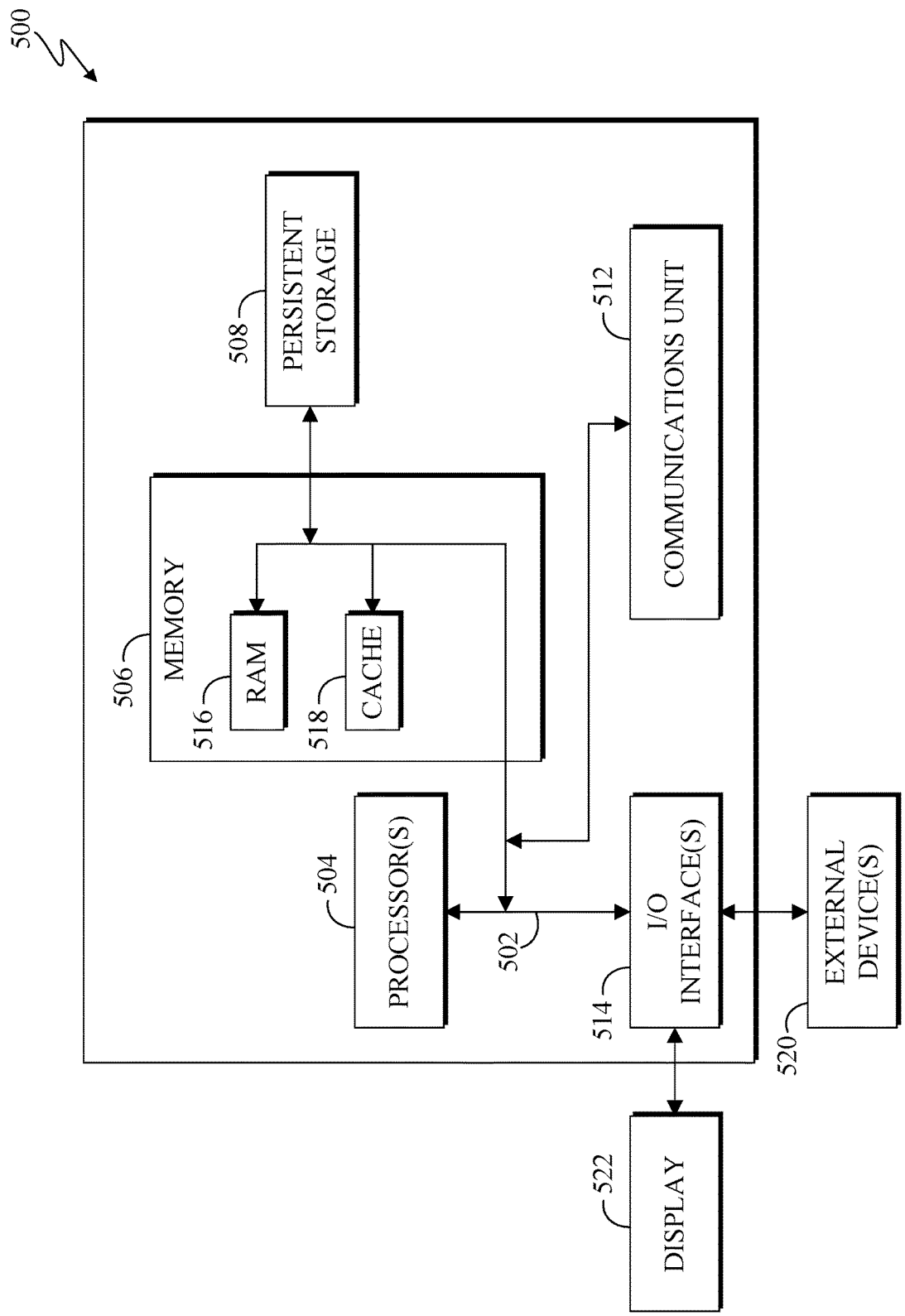
FIG. 5 depicts a block diagram of components of a computer, in accordance with some embodiments of the present invention.

FIG. 5 depicts a block diagram of components of computer 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

One or more programs may be stored in persistent storage 508 for access and/or execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 508 via I/O interface(s) 514. I/O interface(s) 514 also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating natural language processing queries, the method comprising:
   receiving one or more documents, wherein each document comprises a set of words;
   processing the one or more documents and the sets of words to provide a document content matrix V corresponding to the one or more documents and the sets of words, a word feature matrix W corresponding to a set of selected features and the sets of words, and a document feature matrix H corresponding to the one or more documents and the set of selected features;
   forecasting values for each entry of the word feature matrix and the document feature matrix over a selected time interval and a selected set of domains to provide a forecasted word feature matrix W' and a forecasted document feature matrix H' by calculating predicted values for each entry according to trends displayed over time for each word feature and trends displayed in the selected set of domains;
   calculating a set of coefficients for forecasted document feature matrix H' such that V=W'*H';
   determining a rank for each word of the sets of words according to the calculated set of coefficients;
   using a query template to generate one or more queries according to the determined ranks for each word of the set of words, wherein a query template includes slots for one or more word types, and wherein each slot is filled according to the determined ranks for each word of the set of words; and
   executing one or more searches according to the generated one or more queries to provide a set of search results.

2. The method of claim 1, further comprising receiving a set of feature information, wherein the set of feature information indicates one or more features, and wherein the indicated features are the features that are analyzed within each of the documents.

3. The method of claim 2, wherein identifying a set of features for the sets of words comprises using the Newton-Raphson method to calculate a feature value for each feature for the sets of words, wherein the feature value is the appropriate word feature matrix entry.

4. The method of claim 2, wherein identifying a set of features for the sets of words comprises using stochastic gradient descent to calculate a feature value for each feature for the sets of words, wherein the feature value is the appropriate word feature matrix entry.

5. The method of claim 1, wherein determining a rank for each word of the sets of words according to the calculated set of coefficients comprises calculating an average of the coefficients for each word, and sorting the words by average.

6. A computer program product for generating natural language processing queries, the computer program product comprising:
   one or more computer readable storage media and program instructions stored on the one or more computer readable storage media, the program instructions comprising instructions to:
   receive one or more documents, wherein each document comprises a set of words;
   process the one or more documents and the sets of words to provide a document content matrix V corresponding to the one or more documents and the sets of words, a word feature matrix W corresponding to a set of selected features and the sets of words, and a document feature matrix H corresponding to the one or more documents and the set of selected features;
   forecast values for each entry of the word feature matrix and the document feature matrix over a selected time interval and a selected set of domains to provide a forecasted word feature matrix W' and a forecasted document feature matrix H' by calculating predicted values for each entry according to trends displayed over time for each word feature and trends displayed in the selected set of domains;
   calculate a set of coefficients for forecasted document feature matrix H' such that V=W'*H';
   determine a rank for each word of the sets of words according to the calculated set of coefficients;
   using a query template to generate one or more queries according to the determined ranks for each word of the set of words, wherein a query template includes slots for one or more word types, and wherein each slot is filled according to the determined ranks for each word of the set of words; and
   executing one or more searches according to the generated one or more queries to provide a set of search results.

7. The computer program product of claim 6, further comprising instructions to receive a set of feature information, wherein the set of feature information indicates one or more features, and wherein the indicated features are the features that are analyzed within each of the documents.

8. The computer program product of claim 7, wherein instructions to identify a set of features for the sets of words comprise instructions to use the Newton-Raphson method to calculate a feature value for each feature for the sets of words, wherein the feature value is the appropriate word feature matrix entry.

9. The computer program product of claim 7, wherein instructions to identify a set of features for the sets of words comprise instructions to use stochastic gradient descent to calculate a feature value for each feature for the sets of words, wherein the feature value is the appropriate word feature matrix entry.

10. The computer program product of claim 6, wherein instructions to determine a rank for each word of the sets of words according to the calculated set of coefficients comprise instructions to calculate an average of the coefficients for each word, and sort the words by average.

11. A computer system for generating natural language processing queries, the computer system comprising:
one or more computer processors;
one or more computer-readable storage media;
program instructions stored on the computer-readable storage media for execution by at least one of the one or more processors, the program instructions comprising instructions to:
receive one or more documents, wherein each document comprises a set of words; process the one or more documents and the sets of words to provide a document content matrix V corresponding to the one or more documents and the sets of words, a word feature matrix W corresponding to a set of selected features and the sets of words, and a document feature matrix H corresponding to the one or more documents and the set of selected features; forecast values for each entry of the word feature matrix and the document feature matrix over a selected time interval and a selected set of domains to provide a forecasted word feature matrix W' and a forecasted document feature matrix H' by calculating predicted values for each entry according to trends displayed over time for each word feature and trends displayed in the selected set of domains;
calculating a set of coefficients for forecasted document feature matrix H' such that V=W'*H';
determining a rank for each word of the sets of words according to the calculated set of coefficients;
using a query template to generate one or more queries according to the determined ranks for each word of the set of words, wherein a query template includes slots for one or more word types, and wherein each slot is filled according to the determined ranks for each word of the set of words; and
executing one or more searches according to the generated one or more queries to provide a set of search results.

12. The computer system of claim 11, further comprising instructions to receive a set of feature information, wherein the set of feature information indicates one or more features, and wherein the indicated features are the features that are analyzed within each of the documents.

13. The computer system of claim 12, wherein instructions to identify a set of features for the sets of words comprise instructions to use the Newton-Raphson method to calculate a feature value for each feature for the sets of words, wherein the feature value is the appropriate word feature matrix entry.

14. The computer system of claim 12, wherein instructions to identify a set of features for the sets of words comprise instructions to use stochastic gradient descent to calculate a feature value for each feature for the sets of words, wherein the feature value is the appropriate word feature matrix entry.

15. The computer system of claim 11, wherein instructions to determine a rank for each word of the sets of words according to the calculated set of coefficients comprise instructions to calculate an average of the coefficients for each word, and sort the words by average.

* * * * *